Nov. 15, 1927.
L. C. BAYLES
1,649,651
CHUCK FOR ROCK DRILLS
Filed Jan. 11, 1927
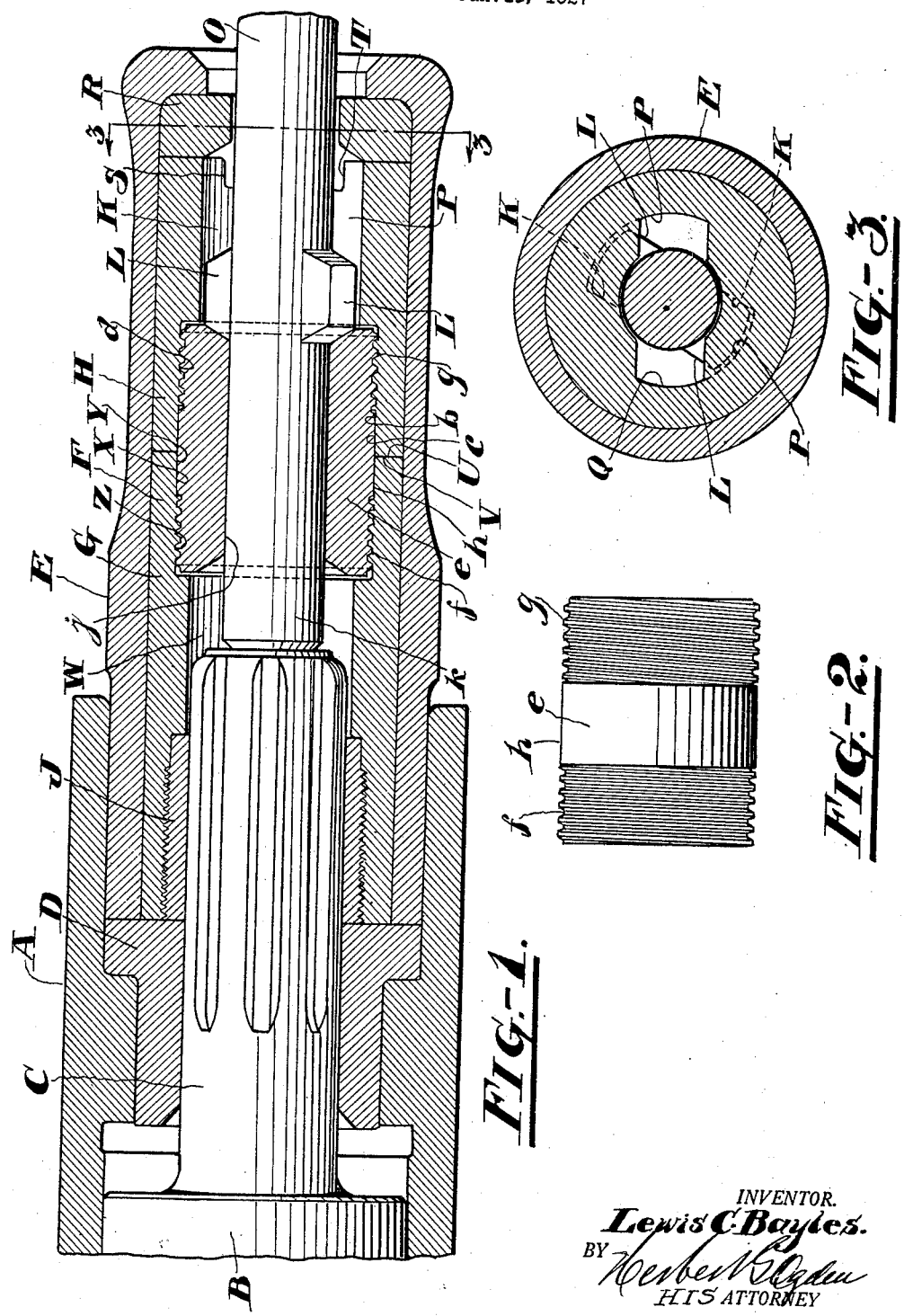
INVENTOR.
Lewis C. Bayles.
BY Herbert Ogden
HIS ATTORNEY Patented Nov. 15, 1927.

1,649,651

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

CHUCK FOR ROCK DRILLS.

Application filed January 11, 1927. Serial No. 160,448.

This invention relates to rock drills, but more particularly to chucks for fluid actuated rock drills of the hammer type. More specifically the invention pertains to that type of rock drill chuck which both guides the working implement and also serves as an element in the rotation mechanism for changing the position of the working implement for each blow of the hammer piston.

One object of the invention is to strengthen the chuck mechanism, thereby eliminating the chances of breakage of these parts.

Another object is to reduce friction between the cooperating surfaces of the chuck and the front head to a minimum.

A still further object is to enable the parts comprising the chuck to be readily assembled and disassembled.

Other objects will appear hereinafter.

The invention consists of the features of construction and arrangement of parts substantially as hereinafter described and claimed and illustrated in the accompanying drawings, in which—

Figure 1 is a longitudinal sectional view of a rock drill having the invention applied thereto, Figure 2 is a side view of the chuck bushing, and Figure 3 is a transverse view taken through Figure 1 on the line 3—3 looking in the direction of the arrows.

Referring to the drawings, A represents the front end of a rock drill cylinder in which is disposed a reciprocatory hammer piston B having a forward fluted nose or extension C. A bushing D forms a closure for the front end of the cylinder A and is held in assembled position by a front head E which extends into the front end of the cylinder and abuts the bushing D.

In accordance with the present invention a chuck mechanism designated generally by F is disposed in the front head E to rotate therein. The chuck mechanism F in this instance comprises two cylindrical members G and H which, for the purpose of identification, will be referred to hereinafter as chuck and chuck jaw respectively. The chuck G is disposed in the rearward end of the front head E and carries a chuck nut J which may be suitably fluted to interlock slidably with the fluted extension C of the piston B.

In the construction shown, the chuck jaw H is disposed in the front end of the front head E and is provided with the usual ribs K which interlock with wings L carried by the drill steel O for transmitting the rotation of the chuck members to the drill steel.

Between the ribs K are formed cavities P to permit limited rotative movement of the drill steel O in the chuck jaw. In this way the wings L may be drawn out of line of the slots Q in a chuck key R which is located in the front end of the front head E for retaining the steel O in the front head.

In order to insure the proper location of the slot Q with respect to the operative position of the wings L, the chuck key R is provided with clutch members S of a well known type which interlock with suitable recesses T formed in the front end of the chuck jaw H. In this way the chuck jaw H and the key R will be caused to rotate as a unit in the front head E.

Heretofore, in rock drills employing the type of chuck to which the present invention pertains, some difficulty has at times been experienced due to breakage of the means, such as clutch members, provided for holding the chuck and chuck jaw in interlocked relationship with respect to each other and when these parts are thus interlocked, it is also difficult at times to maintain the chuck and the chuck jaw in concentric relationship with respect to each other. As a result, considerable friction is caused between the cooperating surfaces of these members and the front head wherein they rotate. In order to eliminate these undesirable features, the chuck G and the chuck jaw H are in this instance provided with smooth unbroken contiguous surfaces U and V respectively, preferably intended to abut each other when the chuck parts are in their operative positions. The chuck G is provided with a central bore W which extends throughout the length of the chuck and is enlarged at its front end as at X. The front end of the enlarged portion X of the bore is in this instance machined to a smooth cylindrical surface Y and between this surface Y and the reduced portion of the bore W are formed screw threads Z which may be of any conventional type.

In like manner a bore $b$ in the chuck jaw H consists of a smooth cylindrical surface $c$ at the rearward end of the bore $b$ and between this surface $c$ and the cavities P are formed screw threads $d$ corresponding to the threads formed in the chuck G.

To the end that the chuck G and the chuck jaw H may be suitably held in operative position with respect to each other, a chuck bushing $e$ having threaded ends $f$ and $g$ is screwed into the chuck G and into the chuck jaw H to hold the end faces U and V of these members firmly together.

Between the threaded portions $f$ and $g$ of the bushing $e$ is formed a smooth unbroken perimetric surface $h$ adapted to bear against and fit closely the surfaces Y and $c$ of the chuck and the chuck jaw so that when these parts are assembled, the chuck and the chuck jaw will be held in concentric relationship with respect to each other.

In addition to the functions described, the chuck bushing $e$ also acts as a guide for the drill steel O and to this end is provided with a central bore $j$ to receive slidably a shank $k$ of the drill steel.

The direction in which the threads of the chuck bushing, the chuck and the chuck jaw should run will at all times be determined by the direction in which it is desired to rotate the drill steel. For instance, if it be desired to rotate the drill steel in a clockwise direction, looking from the left hand end of Figure 1, the cooperating threads should be of a right hand type so that during the operation of the drill, the tendency of the drill steel will be to constantly screw the threaded portions tighter together instead of unscrewing them as would be the case if the threads extended in the opposite direction.

In assembling the chuck mechanism, one end of the chuck bushing $e$ may first be screwed into either the chuck or the chuck jaw. Thereafter the other member comprising the chuck may be screwed on the bushing $e$. The parts thus assembled may then be inserted into the front head and located so that the clutch members S of the chuck key R will enter the recess T of the chuck jaw H.

By means of the present invention the walls of the chuck, the chuck jaw and the bushing $e$ may be constructed of sufficient thickness, and consequent strength, to enable them to withstand the most severe usage and wear without increasing the weight of the drill. Another desirable feature of this invention is that in case it becomes necessary to remove the parts for the purpose of inspection or replacement, the parts comprising the chuck may readily be disassembled without the aid of special tools or appliances.

I claim:

A rock drill front head construction, comprising a front head, a chuck and a chuck jaw in said front head, said chuck and chuck jaw having bores therethrough, the adjacent ends of said bores being of smooth cylindrical formation, threads in the bores, a chuck bushing extending into both bores and having a bore to slidably receive the shank of a drill steel, threads on the ends of the bushing to cooperate with the threads in the chuck and chuck jaw for drawing the ends of the chuck and chuck jaw tightly together, and an intermediate smooth exterior surface on the bushing bearing against the smooth cylindrical portions of the bores for centralizing the chuck and chuck jaw with respect to each other.

In testimony whereof I have signed this specification.

LEWIS C. BAYLES.